Oct. 6, 1936.  S. H. DARNELL  2,056,344
HARVESTER
Filed April 29, 1935   2 Sheets-Sheet 1
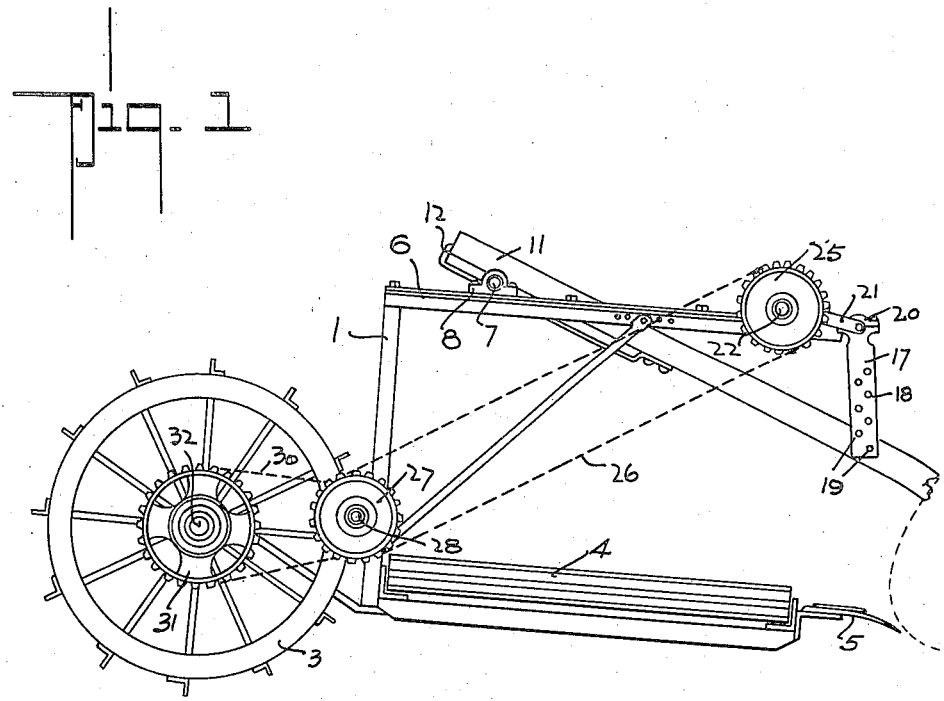
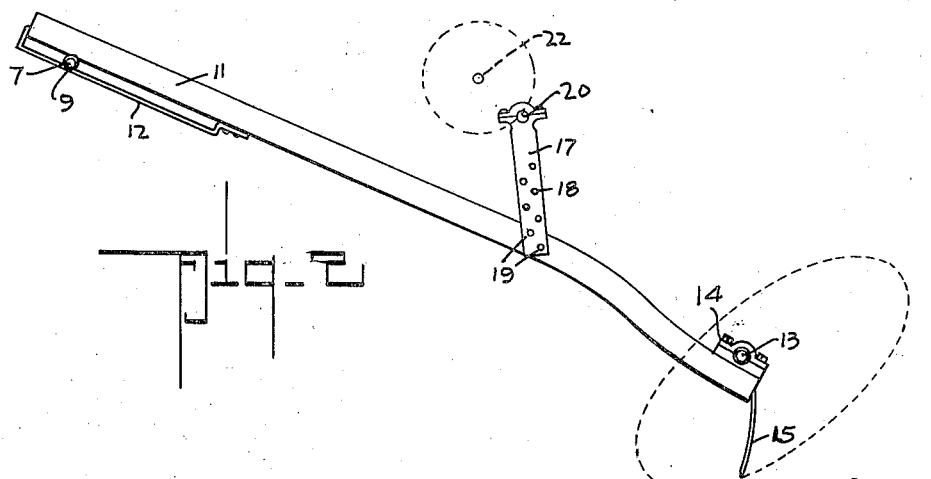
Inventor
Samuel H. Darnell
By
*Herbert E. Smith*
Attorney

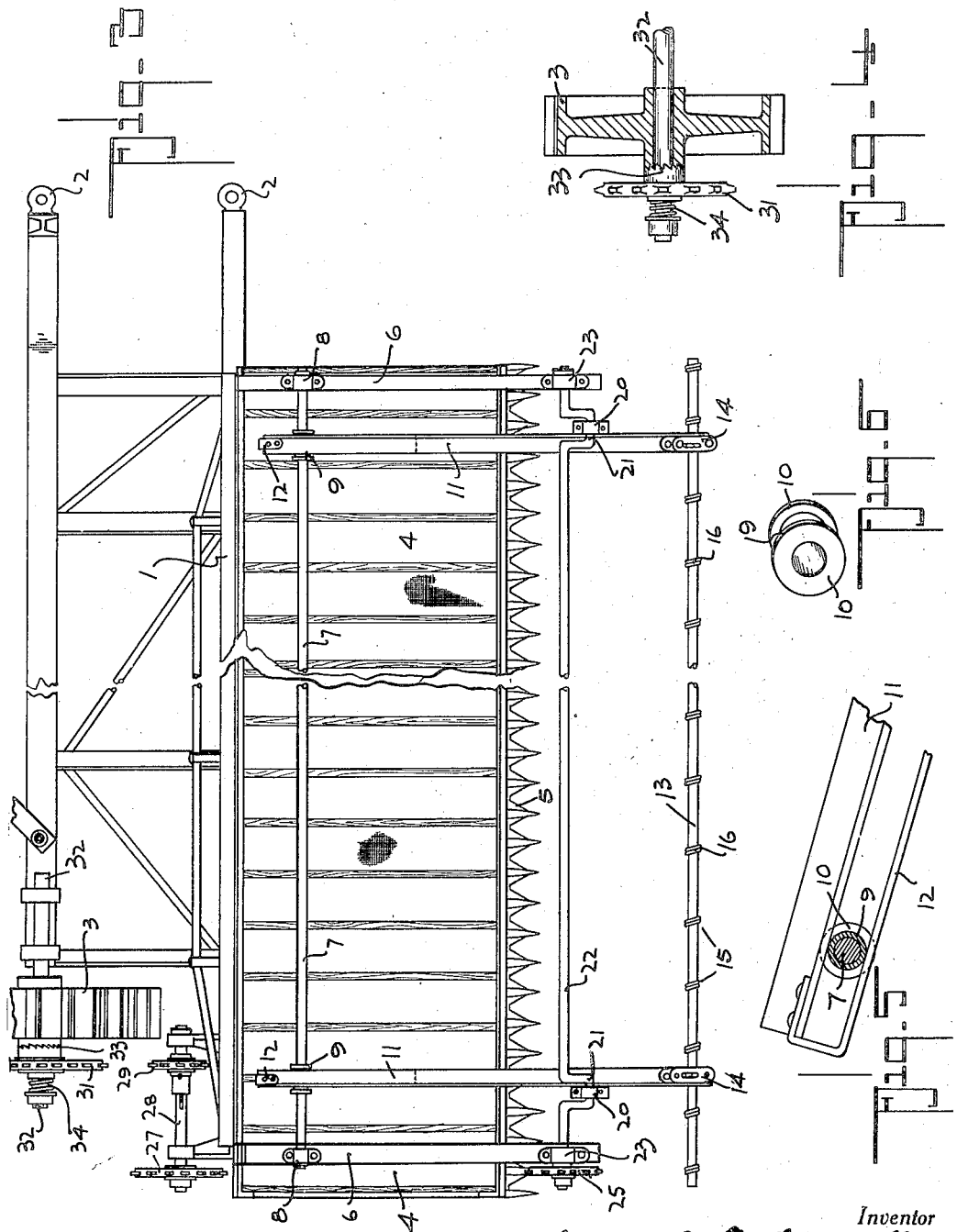

Patented Oct. 6, 1936

2,056,344

UNITED STATES PATENT OFFICE 2,056,344

HARVESTER

Samuel H. Darnell, Malden, Wash.

Application April 29, 1935, Serial No. 18,799

1 Claim. (Cl. 56—219)

My present invention relates to improvements in harvesters and while my invention is adapted for various uses, it is especially designed for use as a part of, or for an attachment to, machines for harvesting vines, where the crops grow close to the ground. The primary object of my invention is to lift or gather the vines, in advance of the cutter, or sickle of the harvester, and to stand the vines or crop upright in front of the cutter, in order that only the stems or stalks may be severed by the cutter. In this manner the vines, with the crop, as for instance a crop of peas, are presented to the approaching or advancing cutter of the harvesting machine in such manner that a seed-crop of peas may be harvested without material loss to the crop.

The apparatus of my invention may be fashioned as an attachment for harvesters already in use; or the apparatus may be built in as a part of the harvesting machine at the time of assemblage during its process of manufacture. Because of its simplicity in construction, the apparatus of my invention may with facility be combined with a harvester, and by the use of power from vehicle-actuated mechanism the apparatus may be operated without the necessity for use of complicated power-transmission mechanism.

The invention consists in certain novel combinations and arrangements of parts forming the gathering device, and its operating mechanism, as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention, but it will be understood that various changes and alterations may be made in the exemplified structure, within the scope of my claim, without departing from the principles of the invention.

Figure 1 is a side elevation of a portion of the harvester showing especially the operating means, and one of the operating arms of the crop-gathering apparatus.

Figure 2 is a detail, side view of one of the operating arms and its crank-mechanism, showing by dotted lines the path of travel of the gathering-tines, or fork.

Figure 3 is a top plan view at the front of the harvesting machine, showing as much thereof as is necessary to illustrate the arrangement of parts, the utility, and the operation of the attachment of my invention.

Figure 4 is an enlarged detail sectional view of the ground wheel, or traction wheel, of the harvester that is utilized to drive the gathering device of my invention, showing also the ratchet or clutch device for one-way transmission of power.

Figure 5 is a detail perspective view of one of the supporting rollers for the operating arms of the fork or vine-gatherer.

Figure 6 is a detail view showing the relation of the roller to the arm which it supports.

In order that the general arrangement, relation of parts, and operation of the gathering mechanism may readily be understood, I have illustrated part of the harvesting machine comprising the draper frame 1, which is hinged to the harvester frame at 2; and the ground wheel 3, which is used as the traction wheel for operating my gathering mechanism, supports the draper frame, and the draper 4, which as usual extends transversely of the harvesting machine, and receives the vines of the crop after they have been cut by the sickle or reciprocating cutter 5 operating at the front of the harvester.

Before the sickle reaches the vines, the latter are gathered up, or lifted from the ground, leaving the stalks or stems standing upright in front of the sickle, while the peas to be harvested are gathered and held uplifted above the sickle out of the path of the cutters. Thus, the gathering mechanism of my invention picks up and elevates the vine-growth, and while uplifted, the crop is passed to the rear, over the cutters as the cutters sever the stems or stalks of the vines. By the final movement of the gathering fork, the severed vines are deposited on the endless conveyor or draper 4 for further treatment of the machine.

Above the main frame of the draper and cutter are mounted two top frame bars 6, 6, laterally spaced apart, and extending in the direction of travel of the harvester with their front ends terminating in advance of the sickle. Near the rear ends of these frame bars and over the rear portion of the draper is mounted a roller-supporting bar 7 that is secured by end brackets 8 on top of these frame bars.

Two laterally spaced rollers 9, 9, are journaled to revolve on the bar, and these rollers are each fashioned with double flanges 10, 10, to provide grooves for co-action with a pair of operating bars or arms 11, 11. The arms are each provided with metal plates 12, 12 the same width as the arms and the ends of the plates are attached to the arms in order to provide slots for the rollers.

The under edges of the arms rest on the rollers, and the rollers rest upon the plates, and the arms are thus adapted to reciprocate longitudinally on the rollers as "floating" fulcrums for a pivotal movement of the arms.

At the forward ends of the arms, in advance of the sickle, is rigidly mounted a transversely extending tine bar 13 which is secured in rotatively adjusted position by means of clamp brackets 14 that are rigidly secured at the front ends of the arms, the two arms and the tine bar thereby forming a U-shaped frame.

At spaced intervals throughout the length of the tine bar are mounted tines 15, preferably of resilient wire, and the tines are attached to the bar by means of spring coils 16. By means of the clamp brackets 14, it will be apparent that the tine bar and its tines may be adjusted to proper position for most efficient operation of the tines in picking up or lifting the vines in advance of the sickle, and of course after the bar is adjusted, the brackets 14 are securely clamped.

The forward end of the U-shaped frame that carries the tines oscillates in a vertical plane, and simultaneously the frame and the tines are reciprocated with a forward and reverse movement, with the center of movement located at the changing or "floating" fulcrum point provided by the rollers 9, 9, and in this manner the tines travel through the path indicated by dotted lines in Figure 2 for picking up and passing the vines to the rear in synchronism with the cutting of the vine-stalks or stems.

The oscillating and reciprocating movement of the U-shaped frame is accomplished through the use of a crank movement which includes crank arms 17, one of which is attached to each of the operating arms 11, and these crank arms are adjustable to vary the length or throw of the movement of the arms. For this purpose the crank arms are provided with a series of bolt holes 18, and bolts 19 in selected holes, are used to rigidly fasten the lower ends of the crank arms to the operating arms.

At their upper ends the crank arms are provided with crank bearings 20 journaled on the U-shaped cranks 21 of a crank shaft 22 that extends parallel with the tine bar with its ends journaled in bearings 23 mounted at the forward or front ends of the frame bars 6, 6.

By revolving the crank shaft in its bearings it will be apparent that the gathering tines are manipulated as indicated in Figure 2 to gather the vines, lift them over and above the sickle, and after the stems are severed, to deposit the vines on the draper 4.

Preferably the crank shaft, which is provided with a sprocket wheel 25, is driven by the forward movement of the harvester, and for this purpose a sprocket chain 26 is extended from wheel rearwardly to a sprocket wheel 27 on the countershaft 28 that is journaled in suitable manner at the rear outer end of the draper frame. The countershaft is revolved through the use of a sprocket wheel 29 of this shaft, and the chain 30 which passes around the sprocket wheel 31 on the shaft 32 or axle of the traction or ground wheel 3. By the use of a ratchet coupling 33 and a spring device 34, a forward-drive clutch is provided between the wheel 3 and the sprocket-drive 31 in order that the drive mechanism for the crank-mechanism will operate only when the harvester is being moved forwardly, or advancing to the harvest, and the machine may be turned, or backed without operating the vine-gathering mechanism.

Having thus fully described my invention, what I claim as new and desire to secure by Letters Patent is:—

The combination in a vine harvesting machine with a supporting frame and a fulcrum bar rigid therewith, and spaced fulcrum-rollers journaled on said bar, of a pair of operating arms having their rear ends mounted on said rollers, guide plates fixed to said arms forming slots at the under sides of the arms for retaining said arms in operative position on the rollers, a rotatively adjustable tine bar mounted at the front ends of and adapted to rigidly join said arms, and means for securing the bar in adjusted position, spaced resilient tines mounted on the tine bar, and means for oscillating said rigidly joined arms.

SAMUEL H. DARNELL.